APPARATUS FOR TESTING ELECTRICAL CONTACT BETWEEN METALLIC OBJECTS
Original Filed Feb. 18, 1972
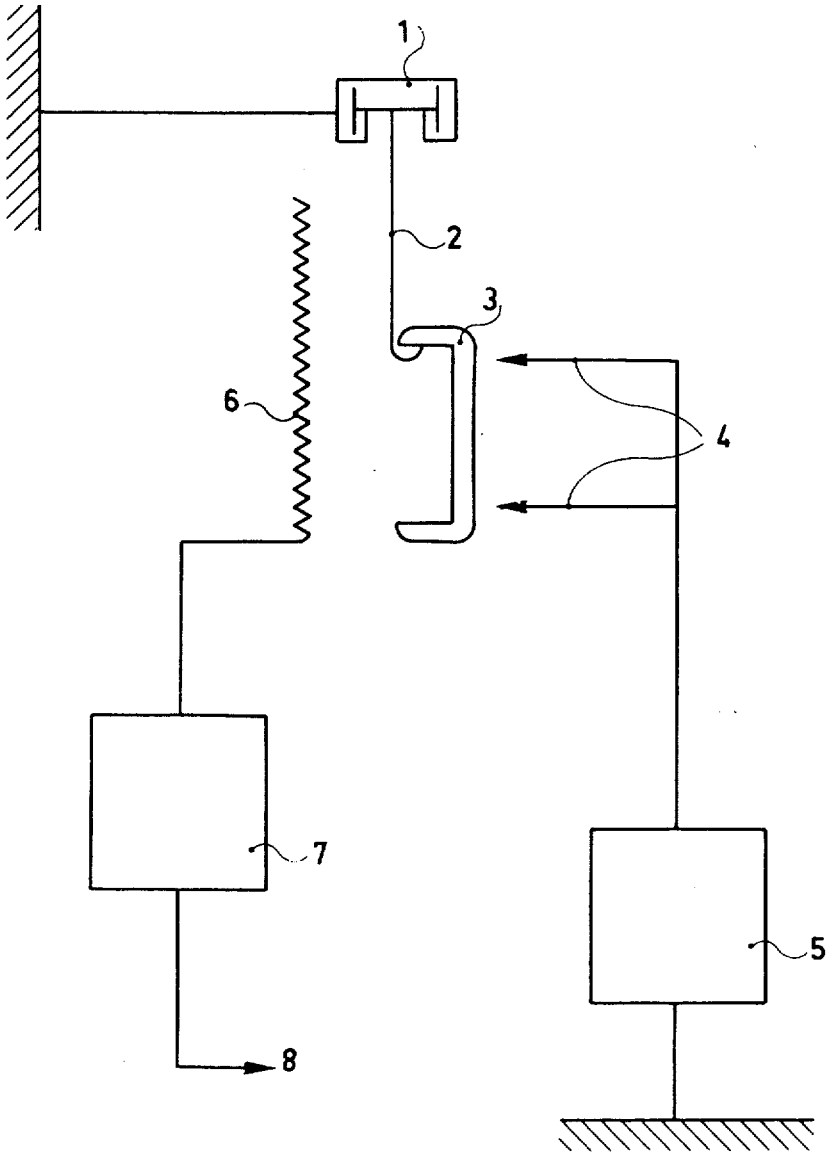

United States Patent

Re. 28,394

Reissued Apr. 15, 1975

28,394

APPARATUS FOR TESTING ELECTRICAL CONTACT BETWEEN METALLIC OBJECTS

Marcel Point, Grenoble, France, assignor to Air-Industrie, Courbevoie, France

Original No. 3,739,228, dated June 12, 1973, Ser. No. 227,361, Feb. 18, 1972. Application for reissue July 12, 1973, Ser. No. 378,669

Claims priority, application France, May 21, 1971, 7118740

Int. Cl. B05b *5/00*

U.S. Cl. 317—3 5 Claims

Matter enclosed in heavy brackets [ ] appears in the original patent but forms no part of this reissue specification; matter printed in italics indicates the additions made by reissue.

ABSTRACT OF THE DISCLOSURE

A device for preventing risks of fire or explosion due to electric sparks which may be produced at the attachment or suspension contacts of metal objects on which an electrostatic coating is intended to be applied, said device comprising means for inducing an electric charge on said metal object, and also means for [giving an information] *detecting a spark* when said electric charge reaches a predetermined dangerous value. The charge-inducing means may utilize the existing high-tension source employed for the electrostatic coating, acting from a distance, and [may comprise a variable-threshold charge-detection device adapted to trip a safety, alarm or indicator means. The device] can be used in automatic electrostatic painting and powder-applying installations.

The present invention relates to a device for preventing risk of fire or explosion due to electric sparks which may be produced at the attachment contacts of metallic objects intended to be covered with an electrostatic coating.

In installations which utilize an electric field created between two electrodes in an inflammable medium, it is important that the electrical contacts should be made with care in order to avoid sparks at the said contacts. These sparks may in fact be the cause of fire or explosions.

This is especially the case in electrostatic coating installations. These latter generally comprise one or more electrodes which are brought up to a high potential, of about a hundred kilovolts for example, and also metallic objects to be coated, fixed on a conveyor by means of hooks, the said conveyor being connected to earth.

The coating product, divided into fine particles may constitute an inflammable mixture with air, and a spark can effectively set fire to or cause the explosion of this mixture.

In order to prevent sparks in the neighborhood of the electrodes, a resistive protection element is added to these latter, placed in series between the electrode itself and the high-tension supply.

Unfortunately, a risk of sparking also exists at other places, more particularly at the place where the part to be coated is hooked-on. A bad contact can in fact exist between the metallic part to be coated and the hooking system, partly covered with paint or powder during the course of a previous passage into the coating cabin. In general, the hooks are not sufficiently well cleaned after passing through the coating installation, so that after a number of successive passages, they are covered with a crust which is sufficiently insulating to prevent electric contact between the metallic object to be coated and the earthed conveyor.

In consequence, the object to be coated, at the moment of its passage close to the electrodes brought up to high tension, acquires electric charges which accumulate on the object until the latter has a potential sufficiently high to cause the breakdown of the insulating crust between the object and the hook by which it is attached, the said breakdown being accompanied by a spark capable of developing sufficient energy to ignite the mixture constituted by the air and the finely divided coating product.

Certain practical measures are taken at the present time in order to minimize this risk. A first measure consists of utilizing hooks provided with sharp points or edges in contact with the objects which are suspended by these hooks, so that the pressure due to the actual weight of the object has a tendency to pierce the insulating crust. A second measure consists, when this is possible, of ensuring the hooking contact at a masked area of the object, the said area not being intended to be covered. A third solution consists of the application by the user of maintenance rules for the systematic cleaning of the hooks. It will readily be understood that these measures, which are solely preventive, cannot be considered as infallible and do not prevent any accidental risk of fire or explosion.

Another solution would consist of ensuring the maintenance of good electrical contact between the object and the conveyor by means of an instrument for measuring the electrical resistance between these latter before the parts pass into the coating cabin. This device necessitates the use of brushes in rubbing contact with the object, which has the drawback that they may scratch the object. On the other hand, measurement of the resistance is not feasible if the part is already covered with a first layer of a coating product, for example a priming coat.

The device forming the object of the invention acts without the use of members in mechanical contact with the object to be coated, so as to verify systematically that the contact is sufficiently well made between the object and its suspension hook on the conveyor, in order to avoid any dangerous sparks. It is characterized by the fact that it comprises means for electrically charging the object, located upstream of the electrostatic coating cabin, the said charge being detected when it has reached a dangerous value, for example by a device for detecting any spark produced at the bad hooking contact.

The invention will be more clearly understood with reference to the description which follows below, this being given by way of example and with reference to the accompanying drawing, which represents diagrammatically an electrical safety device according to the invention, in one of its preferred forms.

The figure shows a transverse section of a metallic object 3 suspended by a metal hook 2 from a conveyor 1 made entirely of metal and connected to earth. As shown, the object is assumed to be placed in a position on the conveyor in front of the entrance to the electrostatic coating cabin.

In accordance with the invention, there has been provided at this point a safety device comprising a high-tension generator 5 connected to one or a plurality of ionizers 4, placed at a short distance from the object 3, together with a spark detector constituted by an antenna 6 connected to a detector-amplifier 7. The detector-amplifier 7 is connected to a safety device 8 arranged to trip an alarm device, a stopping device or any other information recorder.

The operation of the device of the figure is as follows:

During its passage in front of the ionizers 4, the object 3 receives electrical charges conveyed by the ionized air. If the electrical contact between the object 3 and the hook 2 is satisfactory, these charges are naturally evacuated to earth without causing sparks. If the electric contact between the object 3 and the hook 2 is poor, these charges accumulate on the part until this latter is brought up to a potential capable of creating a breakdown spark capable of piercing the insulating layer which creates the bad contact between the object 3 and the hook 2.

The signal emitted by the breakdown spark is received by the antenna 6, and transmitted to the detector-amplifier 7 which itself transmits the information to a safety device 8 permitting either a warning to be given to the staff by a light or audible signal, or the chain to be stopped or the projection to be stopped inside the cabin when the part having the defective electrical hooking contact passes into the cabin.

The detector-amplifier may advantageously be provided with a means for adjusting the sensitivity of detection so as to react only to sparks which exceed a level of energy previously defined as dangerous. The value chosen for the voltage of the generator 5 is a function of the characteristics of the installation, and in particular of the capacity of the object 3. In certain cases, it is advantageously possible to utilize the high-tension source supplying the electrostatic coating cabin itself for also supplying the ionizers 4 of the safety device.

The safety device is mounted upstream of the coating cabin. It is preferably enclosed in a small chamber, the interior of which does not offer any danger of fire or explosion.

[It will of course be understood that the invention is not limited to the use of a spark detector, and any other device for detecting a high voltage charge accumulated on the part which passes in front of the ionizers 4 may also be utilized without departing from the scope of the invention.]

The device forming the object of the invention may be employed in all cases where, in an installation for coating objects by electrostatic painting or powdering, there exists a risk of fire or explosion in the vicinity of the objects to be painted, this fire or this explosion being [possibly] caused by a spark produced at a point of bad electrical contact.

What I claim is:

1. A device for testing the electrical contact between a metallic object and a grounded support on which said object is to be subjected to an electrostatic coating process, said device comprising means for imparting an electrical charge to said object [and means for indicating whether said charge is conducted away from said object through said grounded support or a sufficient charge accumulates on said object to generate a spark between said object and support] *just before it is to be subjected to said coating process, and a spark detector positioned to detect any spark resulting from the imparting of said electrical charge.*

2. A device as claimed in claim 1 in which said charge-imparting means is physically spaced from said object when said charge is imparted.

3. A device as claimed in claim 2 in which said charge-imparting means consists essentially of means for ionizing the air adjacent the object.

[4. A device as claimed in claim 1 in which said indicating means comprises a spark detector.]

5. A device as claimed in claim 1 in which said [indicating means] *spark detector* produces a signal when a charge sufficient to generate a spark accumulates on said object, and comprising a safety device connected to be actuated by said signal.

[6. A device as claimed in claim 5 in which said safety device is an alarm.]

[7. A device as claimed in claim 5 in which said safety device comprises means which stops said coating process in response to said signal.]

[8. In combination, a testing device as claimed in claim 3 and an electrostatic coating installation comprising a high voltage generator, said generator being connected to supply said ionizing means as well as said coating installation.]

[9. The combination claimed in claim 8 in which said testing device is enclosed in chamber outside the entrance to the electrostatic coating installation.]

10. A device as claimed in claim [4] *1* in which said spark detector has a variable detection threshold.

References Cited

The following references, cited by the Examiner, are of record in the patented file of this patent or the original patent.

UNITED STATES PATENTS

| | | | |
|---|---|---|---|
| 3,601,694 | 8/1971 | Checketts et al. | 324—32 |
| 3,611,122 | 10/1971 | Pahl, Jr. | 324—54 |

FOREIGN PATENTS

| | | |
|---|---|---|
| 2,045,678 | 4/1971 | Germany. |

L. T. HIX, Primary Examiner

U.S. Cl. X.R.

324—32, 51; 317—18B